July 26, 1966   L. B. NESBITT   3,262,277
LOW TEMPERATURE THERMAL REGENERATOR
Filed Feb. 2, 1965

Inventor:
Loyd B. Nesbitt,
by Paul A. Frank
His Attorney.

3,262,277
LOW TEMPERATURE THERMAL REGENERATOR
Loyd B. Nesbitt, Alplaus, N.Y., assignor to General Electric Company, a corporation of New York
Filed Feb. 2, 1965, Ser. No. 429,818
13 Claims. (Cl. 62—6)

My invention relates to the maintenance of low temperature environments and, more particularly to a thermal regenerator which operates with high thermal efficiency at very low temperatures.

The use of heat engines, run as refrigerators, that employ the reversing flow cycle technique, which includes a regenerator (thermal accumulator), is advantageous in that where there is adequate heat capacity in the regenerator, these cycles have a higher thermal efficiency, are more immune from contaminant poisoning and degradation of performance and are simpler and less expensive to operate than continuous flow cycles. Unfortunately, the heat capacity of solids which are employed in such regenerators decreases drastically at a $T^3$ rate at low temperatures, in the vicinity of 20° K., or lower. As a result, refrigerators employing thermal cycles that use regenerators have little or no net refrigeration at these low temperatures. A refrigerator operating on a Sterling cycle, a typical one that uses a regenerator, has practically no net refrigeration below 14° K. even though lead, which has one of the highest low temperature heat capacity characteristics, is employed as the regenerator material.

The cycles employing regenerators and the regenerators themselves are quite capable of operating at these low temperatures; the problem becomes one of employing a material for the regenerator or adding a substance to the material presently used in regenerators that will substantially increase their heat retention (heat capacity) at temperatures of approximately 20° K. and below.

The chief object of my invention is the provision of a regenerator that operates with high thermal efficiency at very low temperatures.

Another object of my invention is the method of producing significant heat capacity in low temperature thermal regenerators.

Another object of my invention is the provision of a substance that in combination with the material presently used in regenerators substantially increases their heat capacity for efficient operation over a full range of refrigeration temperatures.

A further object of my invention is the provision of a reversing flow refrigeration cycle, employing a regenerator, having a high thermal efficiency at low temperatures.

These and other objects of my invention will be more readily perceived from the description which follows.

In carrying out the objects of my invention I provide a highly efficient low temperature thermal regenerator by the provision of charcoal as the regenerator material. As cold helium gas comes into contact with the charcoal, a small but effective amount is sorbed thereon, to significantly increase the heat capacity of the regenerator in the low temperature operating range, especially below 20° K.

The attached drawing illustrates preferred embodiments of my invention in which.

Figure 1:
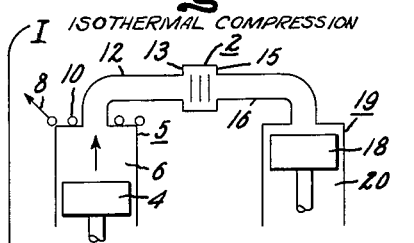
FIGURE 1 is a view of a typical idealized thermal cycle employing the regenerator of my invention.
Figure 1:
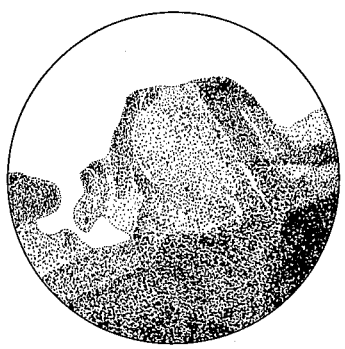

FIGURE 1 illustrates the steps in a typical low temperature refrigeration cycle employing the regenerator of my invention. In FIGURE 1 the four steps, I, II, III and IV, in an idealized Sterling cycle employing my regenerator are depicted. A Sterling cycle is typical of those thermodynamic cycles, including the Ericsson cycle, and the Gifford-McMahon cycle, that employ a reversing flow. In these cycles a regenerator is employed as the element through which the cyclic fluid passes first in one direction and then in the other during its travel. In a reversing flow cycle as gas passes back and forth through the regenerator, heat deposited during flow in one direction is recovered by flow in the other direction, whereas in a continuous flow cycle fluid passes in a continuous path and heat is transferred between two separate continuous paths at the same time rather than in a delayed manner within the same path.

Broadly, the Sterling cycle absorbs heat, from the source desired to be cooled, in an isothermal expansion step, shown in FIGURE 1 (III) and ejects heat in an isothermal compression step, shown in FIGURE 1 (I) to dispose of this heat absorbed.

In my invention, regenerator 2 is filled with a material that has a large surface area per unit volume, such as activated charcoal which has an extensively convoluted outer surface. Charcoal of this fine quality is produced by slowly heating such substances as peach pits or coconut hulls in the absence of air. To achieve low temperature cycles using regenerators, such as the Sterling cycle, helium is employed as the cyclic gas which passes through the charcoal, in regenerator 2, as it flows alternately in each direction through the system. Below approximately 40° K. helium in passing in contact with the charcoal is sorbed thereon to form a thin layer of helium atoms which appear to be rather tenaciously bound to the charcoal. More important, the sorbed helium now has high heat capacity (retention) properties approximating those of a liquid, to thus retain the heat imparted to it. As the helium gas passes in one direction through the system, it imparts heat to the sorbed helium which heat is then recovered by the colder helium gas when it passes through in the reverse direction. This heat retention quality of the sorbed helium, at temperatures below 30° K. is especially significant, since lack of heat retention properties is the principal deficiency with the materials employed in conventional regenerators. The materials presently employed have adequate heat capacity (retention) characteristics at higher temperatures above approximately 30° K. but at low temperatures the heat retention characteristics lessen, to the point where the material of the regenerator warms and cools as quickly as the gas passes therethrough without any ability to retain the heat imparted to it. The heat retention or heat capacity property of solids is generally described by means of their Debye characteristic temperature. At temperatures below approximately $\theta/10$ (where $\theta$ is the Debye characteristic temperature) the heat capacity decreases with extreme rapidity. The conventionally employed regenerative materials have Debye characteristics ($\theta$) of about 200°–140° K. so that the $\theta/10$ expression, results in a lower limiting temperature of between 20 and 14° K. with a slackening in effectiveness substantially above that figure. With the helium sorbed charcoal regenerator that I employ, the liquid like helium, because of the many modes of motion available to it, has a heat capacity that is so large as to effect essentially no limitation on the operation of the regenerator at temperatures significantly below the 14° K., which is presently a limitation. It will therefore be appreciated that by the use of gas sorbed on charcoal as a regenerative material, low temperatures may be achieved with the reversing flow processes that were heretofore unattainable.

As illustrated in FIGURE 1 a typical reversing flow cycle, the Sterling cycle, employing a regenerator, consists of four idealized steps, isothermal compression, FIGURE 1 (I), an initial constant volume gas transfer, FIGURE 1 (II), isothermal expansion, FIGURE 1 (III), and a final constant volume gas transfer, FIGURE 1 (IV). In the first step, isothermal compression, cycle gas in cylinder 6 is compressed, by piston 4, while its temperature is kept substantially constant. The heat of compressor 5 as indicated by arrow 8, is thereby rejected from the system via an aftercooler 10, fins or any other suitable cooling means. Pressurized gas thus produced flows through piping 12 and into high temperature end 13 of regenerator 2 to impart heat to the helium sorbed on charcoal therein. Regenerator 2 as aforementioned, contains charcoal which at these low temperatures sorbs a thin layer of helium having a high heat capacity thereon. The ability of my regenerator 2 to retain heat for a sufficient time interval, when operating at these temperatures of 20° K. and below, until the cyclic helium gas again passes through, is the key to my invention. Without this heat retention characteristic, at these low operating temperatures, no refrigeration would take place. Step 2 as shown in FIGURE 1 (II), is the initial constant volume (isochoric) gas transfer. In this step, compressor piston 4 continues in its upward travel, while expander piston 18 begins its downward travel to thereby effectively transfer the helium gas from compressor 5 to expander 19 while maintaining the gas volume at a substantially constant value. In the next step, isothermal expansion, FIGURE 1 (III), high pressure gas entering expansion cylinder 20 is cooled by doing work in moving piston 18 in this downward direction (at a constant temperature) to thereby absorb heat, as indicated by arrow 22, from load 23 which is being cooled.

In the fourth and final step of this cycle, the final constant volume gas transfer, FIGURE 1 (IV), expander piston 18 returns from the bottom position it was in, in the former step, isothermal expansion, and begins to travel toward the top of cylinder 20 at the same time as compressor piston 4 begins its downward journey from the top position it was in, in this isothermal expansion step. Essentially, this step is a constant volume transfer of helium gas from expander 19 through regenerator 2 to compressor 5. Heat imparted to the sorbed helium gas in regenerator 2 in the initial isochoric gas transfer step, FIGURE 1 (II), and retained therein is imparted by this sorbed helium to the cold helium gas now travelling through regenerator 2 on its way to compressor 5. It is thus essential that regenerator 2 retain the heat imparted to it by the helium gas in the initial isochoric transfer step for a sufficient length of time to then impart this heat to the returning cold gas in the final constant volume gas transfer step. At lower temperatures, temperatures below approximately 20° K., known mediums used for regenerators lack this heat retention characteristic and are therefore useless as far as this refrigeration cycle is concerned. On the other hand, the helium sorbed on charcoal that I employ as a regenerator has a high heat capacity at these same low temperatures where conventional regenerators fail because, as aforementioned, sorbed helium acts in a liquid manner at temperatures below 20° K. to retain the heat imparted to it.

The helium is sorbed onto the charcoal by first running the cycle through the first three steps, FIGURES 1 (I), (II) and (III), and in the last step, the final constant volume gas transfer, FIGURE 1 (IV), a small amount of the cold gas, being transferred from expansion cylinder 20 to compression cylinder 6, in passing through regenerator 2 sorbs itself onto the charcoal in a thin layer, in the order of one atom in thickness. This sorbed helium is then in place on the charcoal and functions in the heat retention manner as previously described. During each pass of the helium gas through regenerator 2 the sorbed helium layer is kept at a relatively constant thickness. This thickness is believed to generally range in the vicinity of one molecule, a monomolecular layer, but may vary therefrom depending on the temperatures and pressures involved in operation. During the first pass of gas from expander 19 to compressor 5 when the initial sorbing process takes place there is a transfer of heat to the gas, because the small amount of gas being sorbed gives up its heat of condensation in sorbing onto the charcoal. Thus, even in the initial pass through regenerator 2 heat is imparted to the gas passing therethrough. Alternatively, the charcoal may be placed in the regenerator with helium sorbed thereon before the system begins operation, in which case the initial pass aforementioned would be unnecessary. It is noted that the charcoal in regenerator 2 is retained therein by means that allows the helium gas utilized in the refrigeration cycle to pass therethrough with a minimal pressure drop and yet keep the charcoal and especially charcoal dust away from moving parts of the system.

It is noted that effective operation of my regenerator takes place at temperatures of 20° K. and below, but it will be appreciated that it functions at temperatures between 20 and 30° K. but its effectiveness is below that achieved during operation at 20° K. and below.

Figure 2:
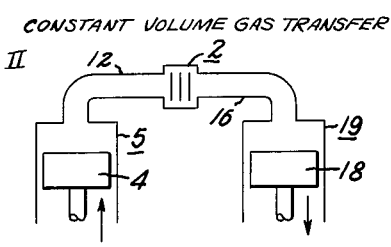
FIGURE 2 is an enlarged idealized view of charcoal.
Figure 2:
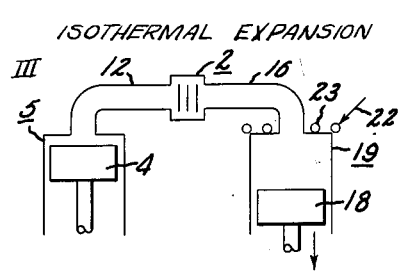
Figure 2:
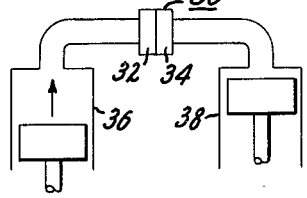

In FIGURE 2, an enlarged, cross-sectional view of the ridged surface of charcoal at a magnification of 50,000 times is shown. Charcoal, because of the intricate convolutions forming its outer surface, has a very large surface area per unit volume, which permits an extremely large thin layer of helium to be sorbed thereon. Charcoal because of this large surface area and ability to effectively have a refrigeration cyclic gas such as helium sorbed thereon, at extremely low temperatures, is particularly well suited for the regenerator I have described. It is noted that other substances such as zeolites and activated alumina may be employed where their qualities of surface area and sorption are of the same effectiveness as charcoal.

Figure 3:
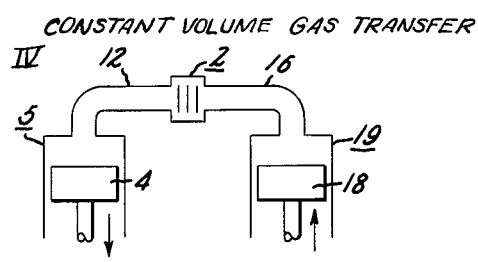
FIGURE 3 is a view of one step in the same thermal cycle as FIGURE 1 employing another mode of the regenerator of my invention.

FIGURE 3 illustrates another form of my invention, in which regenerator 30 includes two parts, conventional regenerator 32 and my low temperature regenerator 34. In this mode, conventional regenerator 32 is employed as the high temperature regenerator for temperatures above about 20° K. whereas low temperature regenerator 34 is employed when system temperatures are desired below about 20° K. Between 20 and 30° K. both regenerators operate, but at reduced effectiveness. Conventional regenerator 32 is placed on the high temperature side of regenerator 30, the side nearer compressor 36, and consists of conventional regenerator material, such as lead pellets, stainless steel balls, or copper screen and operates in exactly the same manner as a conventional regenerator; accepting heat from high temperature gas coming from compressor 36 and transferring this heat to the colder gas coming from expander 38 in the same manner but at higher temperatures, above 20° K., as the cycle previously described. Lower temperature regenerator 34 which is positioned at the low temperature end of regenerator 30 near expander 38 operates effectively at temperatures of 20° K. and below and in the same manner as shown in FIGURES 1 (I)–(IV). A combination regenerator is then provided that operates over a full range of temperatures including those above and below 20° K. Flow is through both regenerators in the same manner as flow through regenerator 2, aforementioned. It is noted that with this combined regenerator 30, the transition between the two regenerators 32 and 34 is in a smooth and continuous manner. When temperatures in the vicinity of 30° K. are reached and high temperature regenerator 32 starts to lose its effectiveness, the helium gas begins to sorb on the charcoal and the low temperature regenerator 34 starts to effect cooling of the system. As aforementioned, it will be appreciated that between approximately 20° K. and 30° K. both regenerators are operating to provide this smooth transition and effective operation throughout all temperatures.

High temperature regenerator 32 serves as the impetus to start the operation of low temperature regenerator 34, which then continues to operate to produce the lower temperatures desired. Suitable means, as mentioned with respect to the prior mode of my invention, is provided to keep the charcoal and charcoal dust from the moving parts of the system and thereby prevent them from interfering with its effective operation. Combined regenerator 30 is then effectively employed for providing a full range of refrigeration temperatures, and especially those below 20° K.

I have mentioned helium gas as the cycle gas in the operation of my regenerator because of the ease and effectiveness in sorbing and heat retention at temperatures below 20° K., but it will be appreciated that other gases or fluids having acceptable properties may be employed.

It is apparent from the foregoing that my invention attains the objectives set forth. Apparatus embodying my invention is sturdy in construction and well adapted for use in conjunction with various low temperature environments. Cooling in cycles using regenerators especially at temperatures below 20° K. is made dependable and highly efficient.

Specific embodiments of my invention have been illustrated but the invention is not limited thereto, since many modifications may be made by one skilled in the art and the appended claims are intended to cover all such modifications as fall within the true spirit and scope of my invention.

What I claim as new and desire to secure by Letters Patent of the United States is:

1. A low temperature thermal regenerator for use in reversing flow refrigeration cycle comprising
   a material having a large surface area per unit volume adapted to readily sorb helium gas, at low temperatures, onto its surface, which gas has high heat retention characteristics in this sorbed state.

2. A low temperature thermal regenerator comprising charcoal having a large surface area per unit volume, adapted to readily sorb helium gas onto its surface, at low temperatures, which sorbed gas has high heat retention properties in this sorbed state.

3. In a low temperature reversing flow refrigeration cycle including a compressor and an expander and having the improvement which comprises
   a low temperature regenerator therebetween comprising
      a material, having a large surface area per unit volume, adapted to readily sorb helium gas, at low temperatures, onto its surface which gas has high heat retention characteristics in this sorbed state.

4. In a low temperature reversing flow reciprocating refrigeration system including a compressor, an expander and a regenerator therebetween the improvement which comprises
   a regenerator comprising charcoal, having a large surface area per unit volume, adapted to readily sorb helium gas onto its surface, at low temperatures, which sorbed gas has high heat retention properties in this sorbed state.

5. In a helium refrigeration system operating at temperatures of 20° K. and below on a reversing flow cycle, including a compressor, and an expander and having the improvement which comprises
   a regenerator in a flow path between the compressor and the expander comprising charcoal having a large surface area per unit volume and adapted to readily sorb helium gas onto its surface at these temperatures of 20° K. and below, which sorbed gas has high heat retention properties in this sorbed state, so that it retains heat transferred to it for a significant period of time, as required by the refrigeration cycle.

6. A thermal regenerator adapted to be used between an expander and a compressor in a reversing flow refrigeration cycle at temperatures of 20° K. and below comprising
   charcoal having a large surface area per unit volume, adapted to readily sorb helium gas onto its surface, at temperatures of 20° K. and below, which sorbed gas has high heat retention properties, so that heat transferred to it is retained for a sufficient length of time to satisfy the refrigeration cycle.

7. A low temperature refrigeration system operating on a reversing flow gas cycle at temperatures of 20° K. and below comprising
   a compressor,
   an expander, and
   a regenerator connected therebetween comprising a material having a large surface area per unit volume, adapted to readily sorb helium gas onto its surface, at temperatures of 20° K. and below, which sorbed gas has high heat capacity properties at these temperatures, so that heat is retained for a sufficient length of time to satisfy the refrigeration cycle.

8. A low temperature refrigeration system operating on a reversing flow helium gas cycle at temperatures of 20° K. and below comprising
   a compressor,
   an expander, and
   a regenerator connected between said compressor and said expander through which the cycle gas flows in travel therebetween, said regenerator comprising charcoal having a large surface area per unit volume, and being adapted to readily sorb helium gas onto its surface, at these temperatures of 20° K. and below, which sorbed gas has high heat retention properties in this sorbed state, so that heat transferred to it by the helium in flow from the compressor is retained for a sufficient length of time to transfer this heat back to the helium when it flows from the expander back to the compressor.

9. A thermal regenerator adapted to be used between an expander and a compressor in a reversing flow gas refrigeration cycle comprising
   a first section of said regenerator positioned adjacent said compressor adapted to function at temperatures above 20° K. and
   a second section of said regenerator positioned adjacent said expander and proximate said first section comprising a material having a large surface area per unit volume adapted to readily sorb the cycle gas onto its surface at temperatures of 20° K. and below, which sorbed gas has high heat retention properties at these temperatures, so that heat transferred thereto is retained for a sufficient length of time to satisfy the refrigeration cycle.

10. A low temperature refrigeration system operating on a reversing flow helium gas cycle at temperatures of 20° K. and below comprising
   a compressor,
   an expander, and
   a regenerator connected between said compressor and said expander through which helium gas flows in travel therebetween including
      a first section positioned adjacent said compressor adapted to function at temperatures above 20° K., and
      a second section positioned adjacent said expander comprising charcoal having a large surface area per unit volume, and being adapted to readily sorb helium gas onto its surface, when said first section lowers the temperature of the system sufficiently, which sorbed gas has high heat retention properties in this sorbed state so that heat transferred to it by the helium in flow from the compressor is retained for a sufficient length of time to transfer this heat back to the helium when it flows from the expander back to the compressor.

11. A method of providing significant heat capacity in a low temperature thermal regenerator employed between a compressor and an expander in a reversing refrigeration cycle comprising the step of
sorbing helium gas on charcoal regenerator material to provide heat retention and dissipation as required during low temperature operation of the refrigeration cycle.

12. A method of operating a reversing flow helium gas refrigeration cycle, containing an expander, a compressor and a regenerator, at temperatures of 20° K. and below comprising the steps of
flowing helium gas from the expander through the regenerator, containing charcoal therein, to the compressor so that a small but effective amount of the helium gas sorbs on the charcoal of the regenerator, at temperatures of 20° K. and below to provide a regenerator with significant heat retention characteristics, and
flowing the helium gas from the compressor, back through the regenerator to the expander, where heat contained in the flowing gas is given up to the sorbed helium, to be retained therein until the gas cycle reverses, and the sorbed helium yields its heat to the flowing helium gas.

13. A method for providing low temperature operation of a regenerator in a reversing refrigeration cycle which includes an expander and a compressor comprising the steps of
sorbing helium gas on the regenerator material to significantly increase its heat retention characteristics,
flowing helium gas from the compressor through the regenerator to impart the heat of the helium gas to the regenerator, and
flowing helium gas back from the expander through the regenerator to impart the heat retained by the sorbed helium gas to the flowing helium gas as required for proper operation of the refrigeration cycle.

References Cited by the Examiner

UNITED STATES PATENTS

| | | | |
|---|---|---|---|
| 2,083,732 | 6/1937 | Moore | 165—4 |
| 2,821,369 | 1/1958 | Hilliard | 165—10 |
| 3,074,244 | 1/1963 | Malaker | 62—6 |

FOREIGN PATENTS 665,899  1/1952  Great Britain.

WILLIAM J. WYE, *Primary Examiner.*